(12) United States Patent
Blankenship et al.

(10) Patent No.: US 6,721,484 B1
(45) Date of Patent: Apr. 13, 2004

(54) FIBER OPTIC NETWORK INTERFACE DEVICE

(75) Inventors: Aaron I. Blankenship, Keller, TX (US); Steve A. Fontaine, Ft. Worth, TX (US); Stephen G. Bloodworth, Ft. Worth, TX (US); Kelly J. Smith, Willow Park, TX (US)

(73) Assignee: Corning Cable Systems LLC, Hickory, NC (US)

( * ) Notice: Subject to any disclaimer, the term of this patent is extended or adjusted under 35 U.S.C. 154(b) by 19 days.

(21) Appl. No.: 10/256,827

(22) Filed: Sep. 27, 2002

(51) Int. Cl.[7] .................................................. G02B 6/00
(52) U.S. Cl. ..................................................... 385/135
(58) Field of Search ................................. 385/135, 134, 385/139, 136

(56) References Cited

U.S. PATENT DOCUMENTS 5,668,911 A * 9/1997 Debortoli ..................... 385/135
6,269,214 B1 * 7/2001 Naudin et al. ............... 385/135

* cited by examiner

*Primary Examiner*—Neil Abrams
*Assistant Examiner*—Phuong Dinh
(74) *Attorney, Agent, or Firm*—Christopher C. Dremann

(57) ABSTRACT

A fiber optic NID includes a base defining an interior cavity and a protective cover. A backplate shaped, sized, and configured to be positioned within the internal cavity defines a first fiber management area, a second fiber management area, and a fiber connecting area. The fiber connecting area includes a raised platform having a connection tray, an adapter, and a routing guide positioned on the platform and secured thereto. The connection tray optically joins an optical fiber of a feeder cable from the first fiber management area to a first connector and an optical fiber of a distribution cable from the second fiber management area to a second connector. The first connector and the second connector are routed along the routing guide to the adapter and optically joined to connect the optical fiber of the feeder cable and the optical fiber of the distribution cable.

26 Claims, 5 Drawing Sheets

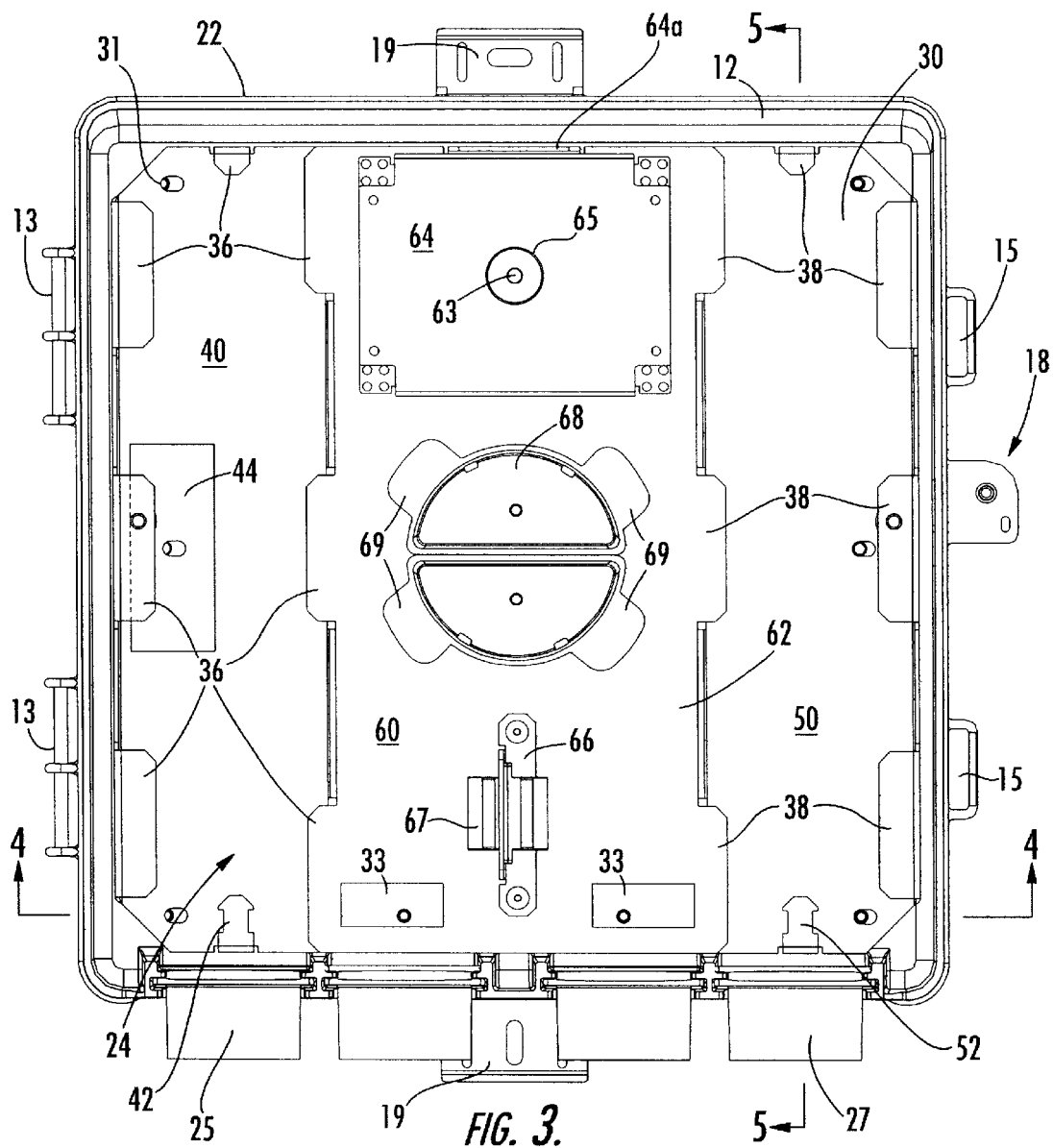
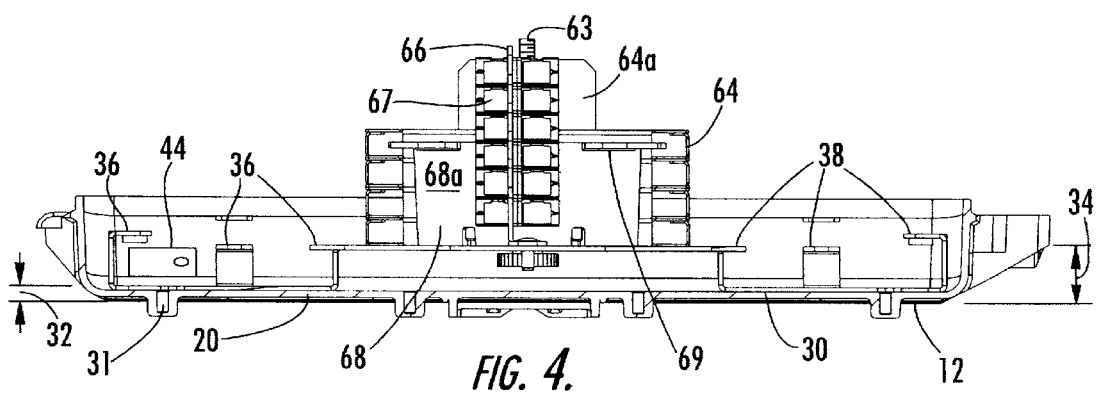
FIG. 3.
FIG. 4.

FIBER OPTIC NETWORK INTERFACE DEVICE

FIELD OF THE INVENTION

The invention relates generally to an enclosure for interconnecting optical fibers. More particularly, the invention is a network interface device (NID) for connecting an optical fiber of a feeder cable to an optical fiber of a distribution cable at a subscriber premises.

BACKGROUND OF THE INVENTION

Communications service providers are currently installing fiber optic networks that extend to homes and businesses. Such networks are commonly referred to as to as "fiber-to-the-home (FTTH)" or "fiber-to-the-business (FTTB)" networks. As fiber optic networks are installed closer to homes and businesses, there is an increasing need for a network interface device (NID) located at the subscriber premises that permits the service provider direct access to the optical connections between the network and the subscriber. The NID provides access to the optical connections for installation, reconfiguration and test operations. The NID also serves as the required demarcation point between the network fiber optic cable, referred to herein as the feeder cable, and the subscriber fiber optic cable, referred to herein as the distribution cable. Typically, the NID is mounted in a restricted access location, such as inside a utility closet, at the subscriber premises. Alternatively, the NID may be mounted outside the subscriber premises and the protective cover locked to prevent unauthorized access to the optical components within the NID.

Naturally, it is highly desirable to utilize the housing of an existing NID in an optical network to minimize tooling and manufacturing costs, and to maintain customer acceptance. Existing NID housings, however, are not configured to be readily converted from electrical (e.g., copper) components and connections to fiber optic components and connections. Existing NID housings are designed to receive electrical components, such as ground buses, station protectors, line modules, protected termination devices (PTDs), and the like, that are electrically connected by, for example, screw terminals, insulation displacement connectors (IDCs), or solder connections. A fiber optic NID, on the other hand, must be designed to receive optical components, such as fanout kits, connection trays (e.g., splice trays, coupler trays, etc.), routing guides, adapters, and the like, that are optically connected. Therefore, a need exists for a configuration of optical components that may be readily installed in an existing NID housing and optically connected for use in an optical network.

BRIEF DESCRIPTION OF THE DRAWINGS

The present invention will be described in conjunction with the accompanying drawings in which like reference numerals represent the same or similar parts in the various views. The drawings, which are incorporated in and constitute a part of this specification, provide further understanding of the invention, illustrate various embodiments of the invention, and, together with the description, help to fully explain the principles and objectives thereof. More specifically:

FIG. 3 is a front plan view of the fiber optic NID of FIG. 1 and shown with the protective cover removed;

FIG. 4 is a sectional view of the fiber optic NID of FIG. 1 taken along the line 4—4 in FIG. 3;

DETAILED DESCRIPTION OF THE INVENTION

The invention is described more fully hereinafter with reference made to the accompanying drawings, in which preferred embodiments of the invention are shown. The invention may, however, be embodied in many different forms, and therefore, should not be construed as being limited to the particular embodiments shown and described herein. Illustrative embodiments are set forth herein so that this description will be thorough and complete, and will fully convey the intended scope of the claimed invention while enabling those skilled in the art to make and practice the invention without undue experimentation. Positional terms, such as left, right, top, bottom, front, rear, side, etc., and relational terms, such as larger, smaller, nearer, farther, etc., are utilized herein for purposes of explanation only, and as such, should not be construed as limiting the scope of the invention or the appended claims in any manner.

Figure 1:
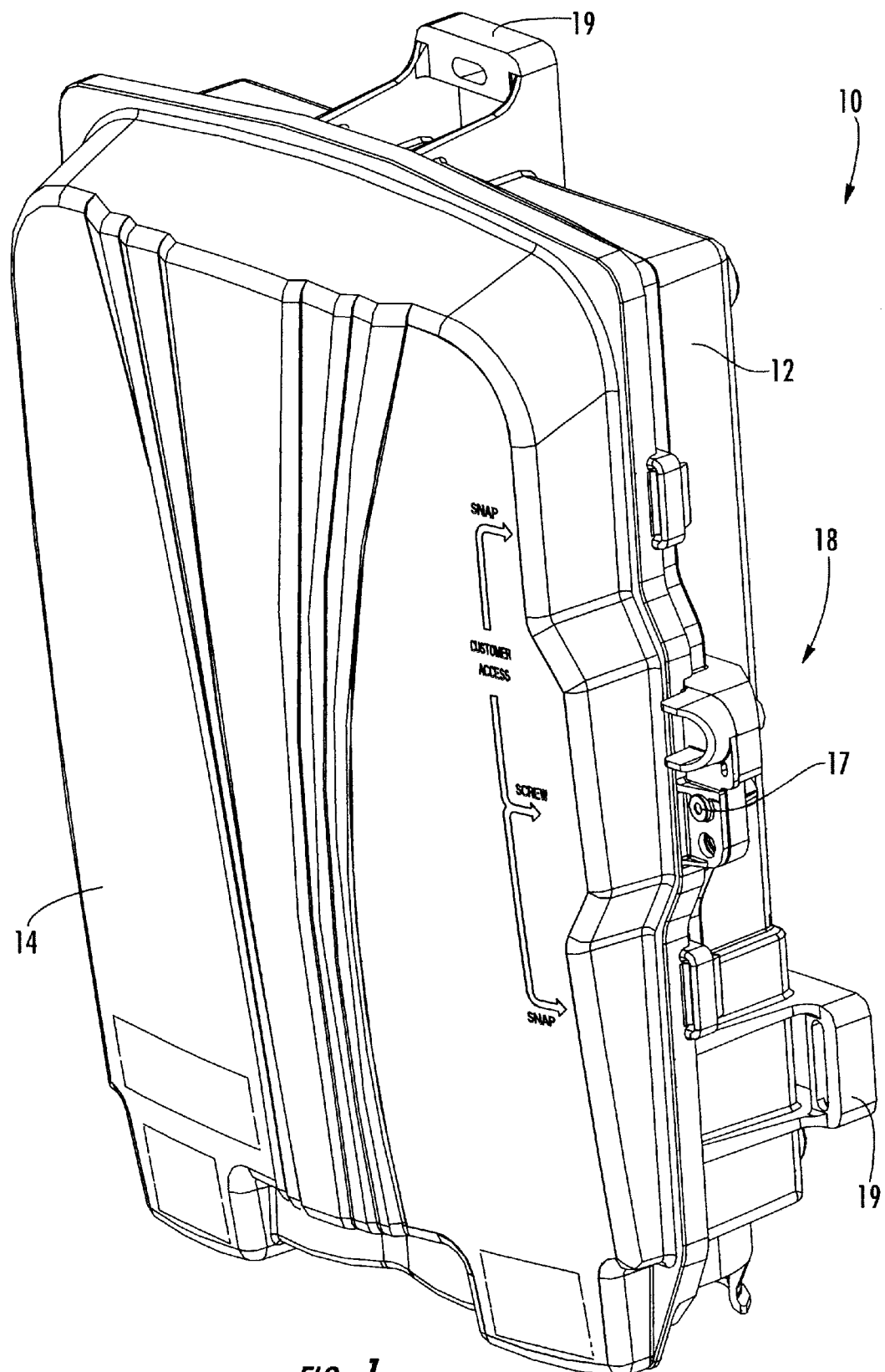
FIG. 1 is a front perspective view of a fiber optic NID constructed in accordance with the invention and shown with the protective cover closed.
Figure 2:
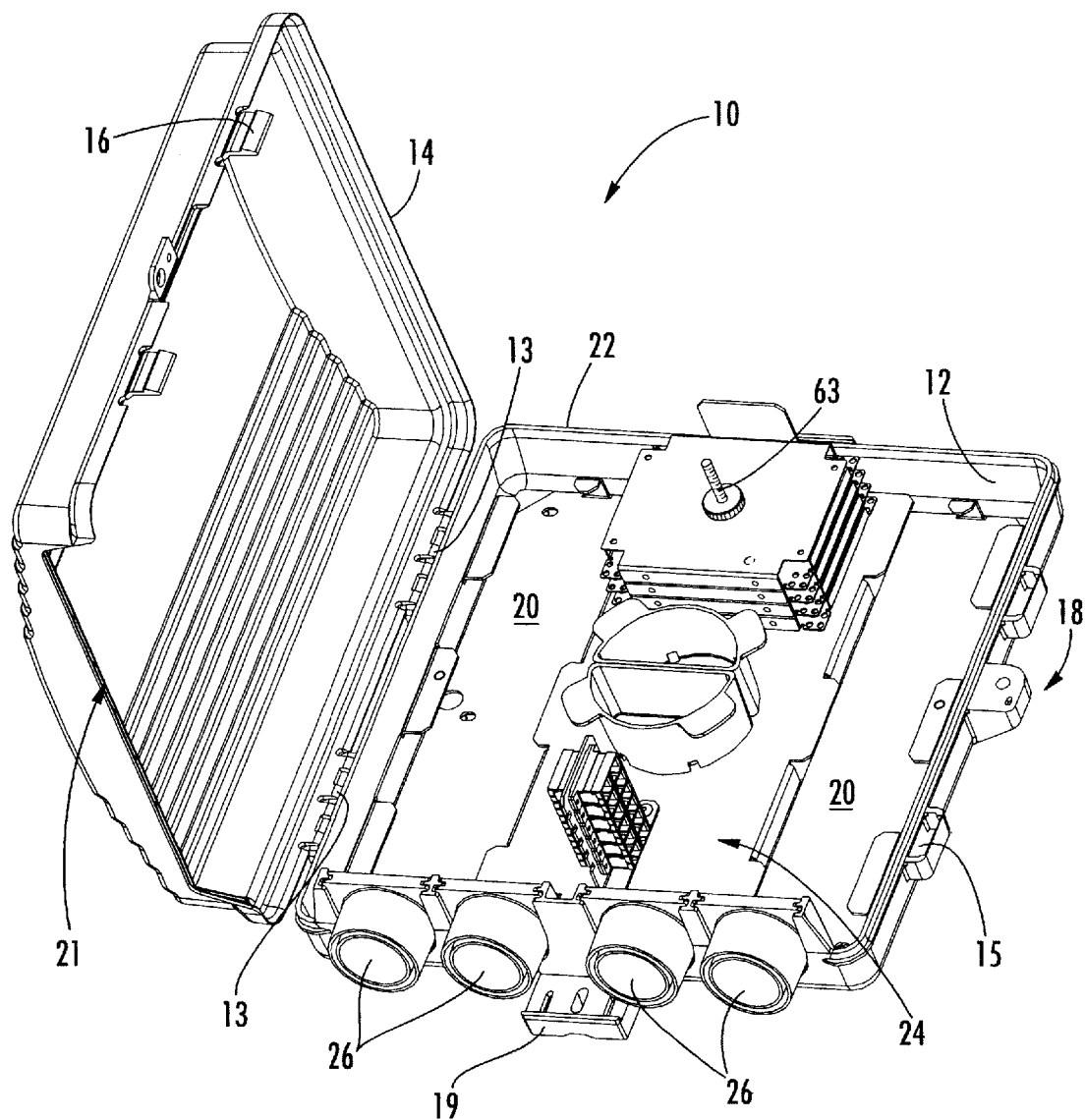
FIG. 2 is a front perspective view of the fiber optic NID of FIG. 1 and shown with the protective cover opened.
Figure 5:
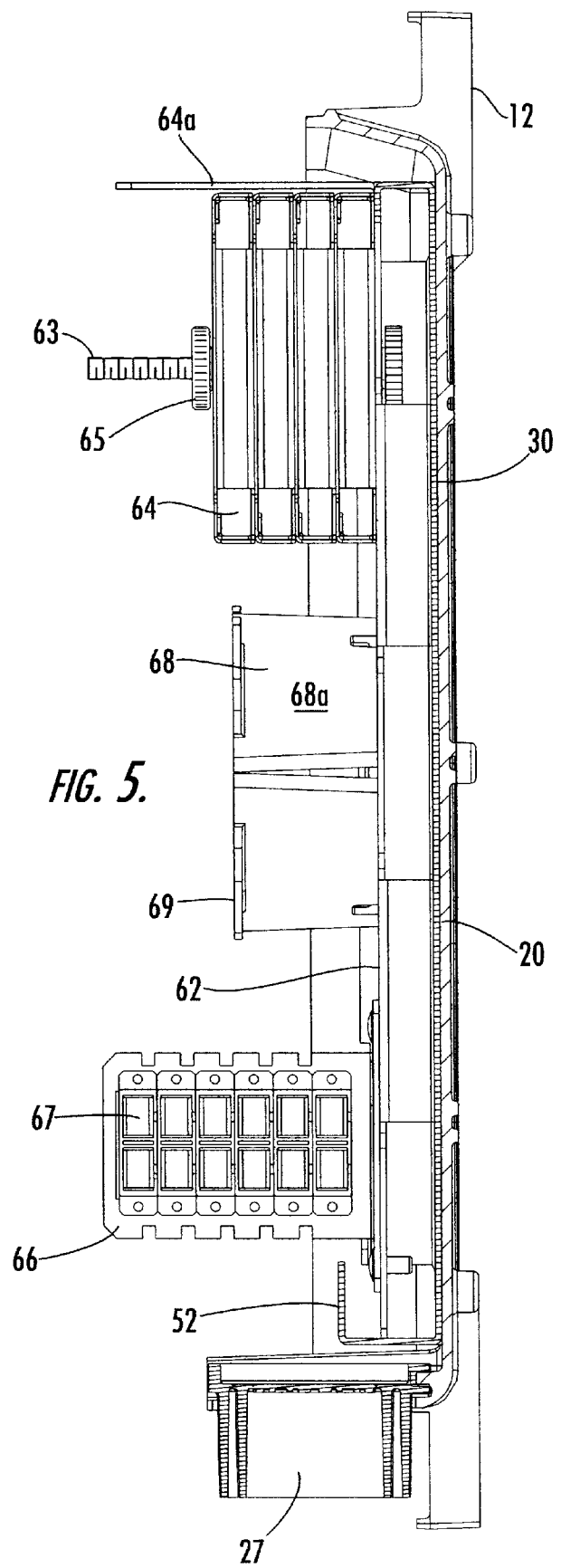
FIG. 5 is a sectional view of the fiber optic NID of FIG. 1 taken along the line 5—5 in FIG. 3.

Referring to the figures, FIGS. 1–5 show a fiber optic NID, indicated generally at 10, constructed in accordance with one aspect of the invention. The NID 10 comprises a base 12 and a protective cover 14 movably attached to the base 12. The base 12 and the cover 14 may be made of any relatively rigid material, such as sheet metal, but preferably are made of a molded plastic, such as PVC, polyethylene, or polypropylene. The cover 14 is movable between a closed position, as shown in FIG. 1, and an opened position, as shown in FIG. 2. The cover 14 may be movably attached to the base 12 in any suitable manner, but preferably is attached to the base 12 by a series of hinges 13 located along one side of the base 12. Accordingly, the cover 14 pivots about the hinges 13 between the closed position and the opened position to provide access to the interior of the NID 10. As shown, the base 12 is provided with openings 15 and the cover 14 is provided with snaps 16 that are received within the openings 15 to secure the cover 14 on the base 12 in the closed position. The base 12 and the cover 14 may also be provided with means 18 opposite the hinges 13 for locking the cover 14 on the base 12. For example, means 18 may comprise a locking screw 17 that requires an industry specific tool to remove. Alternatively, means 18 may comprise aligned openings through the base 12 and the cover 14 that receive a combination or key lock (not shown) belonging to the subscriber. The base 12 further comprises one or more feet 19 for mounting the NID 10 in a known manner to a wall or other building structure at the subscriber premises. Typically, the NID 10 is mounted in a restricted access location, such as inside a utility closet. Alternatively, the NID 10 may be mounted outside the subscriber premises and the cover 14 locked on the base 12, as described hereinabove, to prevent unauthorized access to the optical components and connections housed within the NID 10.

The base 12 of the NID 10 comprises a floor 20 and a continuous sidewall 22 depending upwardly along the periphery of the floor 20. Together, the floor 20 and the sidewall 22 of the base 12 define an interior cavity 24 for receiving optical components and connections within the NID 10. As shown, the sidewall 22 extends upwardly from the floor 20 a greater distance along the bottom of the NID 10 and the cover 14 has a corresponding recess 21 formed therein to receive a plurality of entry ports 26 (FIG. 2). Each entry port 26 is in communication with the interior cavity 24 defined by the base 12 to permit fiber optic cables, as will be described hereinafter, to be routed into the NID 10. The NID 10 may be provided with any convenient number of entry ports 26. Preferably, however, the NID 10 is provided with at least a first port 25 (FIG. 3) for receiving a feeder cable from an optical network and a second port 27 (FIG. 3) for receiving a distribution cable from a subscriber premises. The entry ports 26 may be provided with a removable seal or cap (not shown), or with a grommet having a punch-out pattern, to prevent contaminants, such as moisture, dirt, or infestations, from entering the NID 10 when the entry port 26 is not in use. When in use, the entry ports 26 may also be sealed with a gel or grease around the fiber optic cable in a known manner to prevent contaminants from entering the NID 10. As shown and described herein, the first port 25 for receiving the feeder cable is located adjacent the hinged side of the base 12 and cover 14, and the second port 27 for receiving the distribution cable is located adjacent the side of the NID 10 opposite the hinges 13. The first port 25 and the second port 27, however, may be located at any convenient location relative to the interior cavity 24 of the NID 10. Furthermore, the first port 25 and the second port 27 may be combined into a single entry port 26 for receiving both the feeder cable and the distribution cable.

As best shown in FIG. 3, the NID 10 further comprises a backplate 30 that is positioned within the interior cavity 24 defined by the base 12. The backplate 30 is shaped, sized, and configured to be attached to the floor 20 of an existing NID housing designed to protect conventional electrical components and connections. As a result, the tooling and manufacturing costs associated with the fiber optic NID 10 are minimized. Furthermore, acceptance of the fiber optic NID 10 by customers of the electrical NID is maintained. Once positioned and secured within the interior cavity 24 by conventional fasteners 31, such as snap locks, screws, rivets, or the like, the backplate 30 defines a first fiber management area 40, a second fiber management area 50, and a fiber connecting area 60. The first fiber management area 40, the second fiber management area 50, and the fiber connecting area 60 may be shaped, sized, and located within the interior cavity 24 in any suitable manner. As shown and described herein, the first fiber management area 46 is located adjacent the hinged side of the base 12 and the cover 14. Accordingly, the first port 25 is in direct communication with the first fiber management area 40. The second fiber management area 50 is located adjacent the side of the NID 10 opposite the hinges 13. Accordingly, the second port 27 is in direct communication with the second fiber management area 50. The fiber connecting area 60 is located adjacent the first fiber management area 40 and the second fiber management area 50 so that the lengths of optical fiber that must be routed within the interior cavity 24 are minimized. Preferably, the fiber connecting area 60 is located within the interior cavity 24 medially between the first fiber management area 40 and the second fiber management area 50.

As best shown in FIG. 4, the first fiber management area 40 and the second fiber management area 50 are located at a first elevation 32 on the backplate 30, while the fiber connecting area 60 is located at a second elevation 34 on the backplate 30 that is different than the first elevation 32. In particular, the first fiber management area 40 and the second fiber management area 50 are located immediately adjacent the floor 20 of the base 12 of the NID 10. The fiber connecting area 60, on the other hand, is elevated a predetermined distance above the floor 20 of the base 12 of the NID 10. The position of the first elevation 32 relative to the position of the second elevation 34 separates the routing of the feeder cable and the distribution cable into the interior cavity 24 from the splicing and connecting of the feeder cable and the distribution cable performed within the interior cavity 24. Furthermore, the position of the first elevation 32 relative to the position of the second elevation 34 creates a slack basket effect within the first fiber management area 40 and the second fiber management area 50 while providing a smooth transition for the feeder cable from the first fiber management area 40 to the fiber connecting area 60 and for the distribution cable from the second fiber management area 50 to the fiber connecting area 60. The first fiber management area 40 and the second fiber management area 50, however, may be located at different elevations on the backplate 30 above the floor 20. Furthermore, the elevation of the first fiber management area 40 and the second fiber management area 50 relative to the fiber connecting area 60 may be reversed.

First fiber management area 40 manages the feeder cable and the optical fiber of the feeder cable that enters the interior cavity 24 through first port 25. In particular, the feeder cable may be strain relieved as it enters the first fiber management area 40, and slack lengths of the feeder cable and/or optical fiber of the feeder cable may be stored therein. As shown herein, backplate 30 comprises a strain relief bracket 42 for strain relieving the feeder cable with a clamping device (not shown), such as a cable wrap, adjacent the first port 25. The backplate 30 further comprises at least one, and preferably a plurality, of retaining flanges 36 that project into the first fiber management area 40 for retaining slack lengths of the feeder cable and/or optical fiber of the feeder cable. A conventional fanout kit 44 may also be located within first fiber management area 40 to separate at least some of the buffer tubes of the feeder cable and thereafter route optical fibers into one or more transport tubes that deliver the optical fibers from the first fiber management area 40 to the fiber connecting area 60, as will be described hereinafter with reference to FIG. 6. In a typical fiber optic network, each transport tube delivers a pair of transmit and receive optical fibers for a single telephone line to the fiber connecting area 60. In the preferred embodiment shown and described herein, first fiber management area 40 occupies about 25% of the available space within interior cavity 24. However, first fiber management area 40 may occupy more or less of the available space within the interior cavity 24 as required by the particular configuration of optical components housed within the NID 10.

Similarly, second fiber management area 50 manages the distribution cable and the optical fiber of the distribution cable that enters the interior cavity 24 of the NID 10 through second port 27. In particular, the distribution cable may be strain relieved as it enters the second fiber management area 50, and slack lengths of the distribution cable and/or optical fiber of the distribution cable maybe stored therein. As shown herein, backplate 30 comprises a strain relief bracket 52 for strain relieving the distribution cable with a clamping device (not shown), such as a cable wrap, adjacent the second port 27. The backplate 30 further comprises at least one, and preferably a plurality, of retaining flanges 38 that project into second fiber management area 50 for retaining slack lengths of the distribution cable and/or optical fiber of the distribution cable. Although not shown herein, a conventional fanout kit similar to fanout kit 44 may be located within second fiber management area 50 to separate at least some of the buffer tubes of the distribution cable and to route one or more optical fiber pairs into transport tubes that deliver the optical fibers from the second fiber management area 50 to the fiber connecting area 60. In the preferred embodiment shown and described herein, second fiber management area 50 occupies about 25% of the available space within interior cavity 24. However, second fiber management area 50 may occupy more or less of the available space within the interior cavity 24 as required by the particular configuration of optical components housed within the NID 10.

Fiber connecting area 60 connects the optical fiber of the feeder cable and the optical fiber of the distribution cable. In particular, the optical fiber of the feeder cable is first optically joined to a first connector, and the first connector is then routed to an adapter. Similarly, the optical fiber of the distribution cable is first optically joined to a second connector, and the second connector is then routed to the adapter in optical alignment with the first connector. The first and second connectors are optically joined through the adapter to connect the optical fiber of the feeder cable and the optical fiber of the distribution cable. As shown herein, backplate 30 comprises a platform 62 located within the fiber connecting area 60 medially between the first fiber management area 40 and the second fiber management area 50. At least one connection tray 64 is positioned on the platform 62 adjacent the side wall 22 of the base 12 opposite the entry ports 26. The connection tray 64 may be any known device for joining optical fibers, for example a splice tray, a coupler tray, an adapter tray, a splice organizer, a splice holder, or the like. As shown, connection tray 64 is a conventional splice tray and a plurality of the connection trays 64 are secured on the platform 62 in stacked relationship. Typically, the NID 10 is provided with up to six splice trays, each of which is capable of forming and housing up to four separate splices. The connection trays 64 may be secured in any known manner, but preferably are secured to the platform 62 on an externally threaded stud 63 by an internally threaded fastener 65, such as a wing nut. The connection trays 64 may also be aligned and retained in stacked relationship by a positioning plate 64a that depends substantially perpendicularly from the platform 62. The connection tray 64 receives an optical fiber of the feeder cable from the first fiber management area 40 and optically joins it to a first connector, as described hereinafter with reference to FIG. 6. The same or a different connection tray 64 receives an optical fiber of the distribution cable from the second fiber management area 50 and optically joins it to a second connector, as similarly described hereinafter with reference to FIG. 6. Although not shown herein, the NID 10 may be further provided with means for supporting splice equipment and holding one or more splice trays during splicing operations. For example, backplate 30 may have slots 33 formed therein for receiving the legs or braces of a work platform that attaches to the NID 10. The work platform may be stored inside the NID 10 or may be an external tool that is carried by a field technician for use with a number of NIDs at different locations in the optical network.

The fiber connecting area 60 further comprises an adapter bracket 66 for receiving the first connector and the second connector. The adapter bracket 66 is positioned on the platform 62 adjacent the sidewall 22 of the base 12 including the entry ports 26. The adapter bracket 66 comprises a plurality of adapters 67 for receiving the first connector and the second connector in optical alignment to join the optical fiber of the feeder cable and the optical fiber of the distribution cable. As shown herein, the adapter bracket 66 comprises two vertical columns of six duplex adapters 67 for receiving conventional "plug-and-play" duplex SC style connectors. The plug and play adapters 67 permit a field service technician to install a testing device, such as an OTDR launch cord, at the adapter to verify proper operation of the network at the subscriber premises. Preferably, the adapters 67 are arranged in adjacent pairs corresponding to the transmit and receive optical fiber pairs of separate telephone lines. As shown and described herein, the NID 10 is configured to connect up to six separate telephone lines with different optical fiber pairs of the feeder cable. As such, the NID 10 is commonly referred to as a "six pair fiber optic NID." The fiber connecting area 60 further comprises at least one routing guide 68 for routing the first connector and the second connector from the connection tray(s) 64 to the adapter bracket 66. The routing guide 68 is located on the platform 62 medially between the connection tray(s) 64 and the adapter bracket 66. The routing guide 68 preferably has an outer surface 68a that is rounded to maintain the minimum bend radius of the first and second connectors, and comprises a plurality of retaining flanges 69 for retaining the first and second connectors on the routing guide 68.

Figure 6:
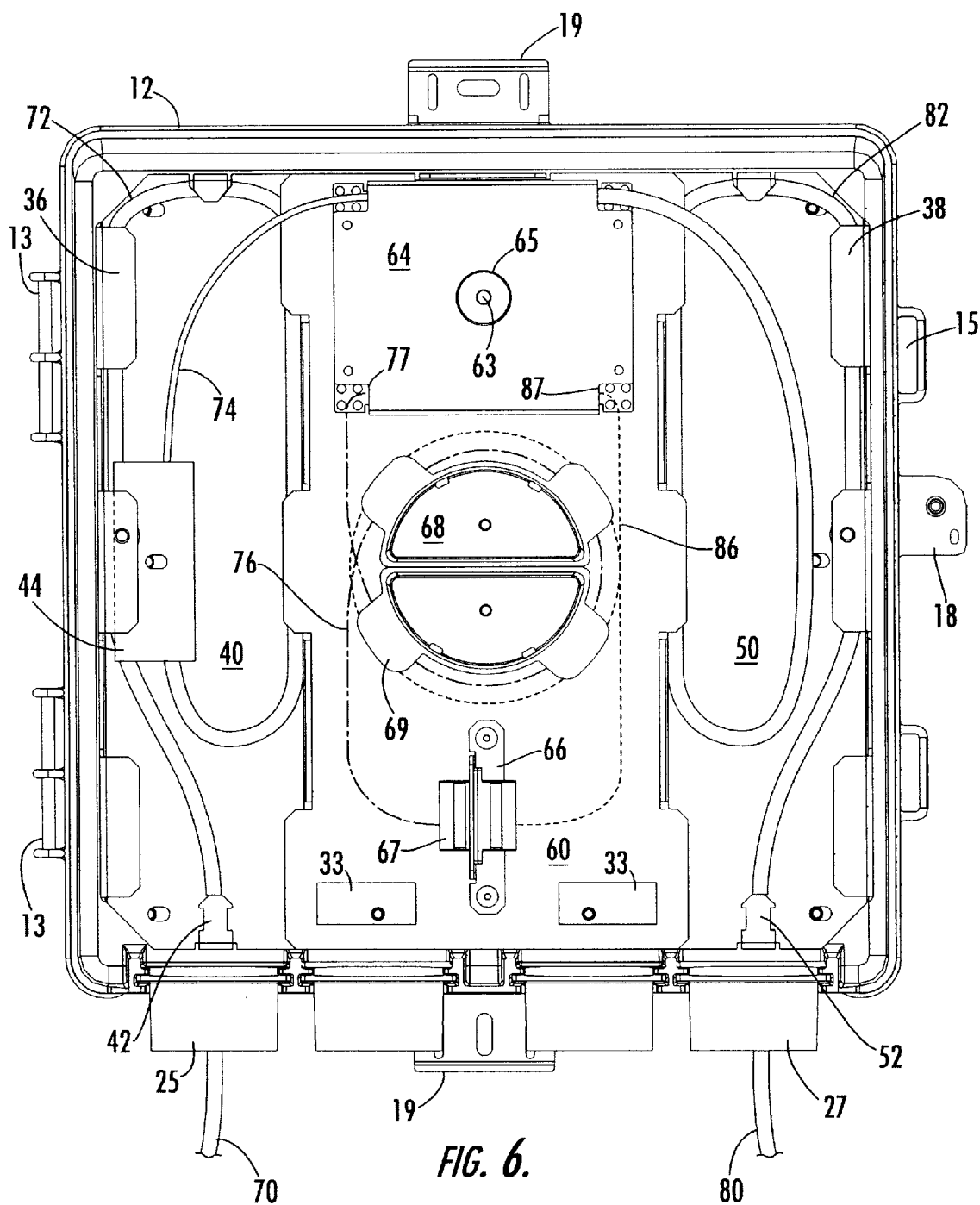
FIG. 6 is a front plan view of the fiber optic NID of FIG. 1 illustrating a method of connecting an optical fiber of a feeder cable and an optical fiber of a distribution cable according to the invention.

FIG. 6 illustrates a method according to the invention for connecting an optical fiber of a feeder cable to an optical fiber of a distribution cable at a subscriber premises. An exemplary routing of the feeder cable, indicated generally at 70, and the distribution cable, indicated generally at 80, is depicted in FIG. 6. Preferably, feeder cable 70 is a drop cable from a fiber optic closure, remote terminal, or other local access point in an optical network. Feeder cable 70 comprises a relatively flexible jacket made of a weatherproof material, such as plastic, for protecting at least one, and preferably at least a pair, of optical fibers. Typically, the jacket of the feeder cable 70 encases a plurality of buffer tubes that each comprise at least a pair of optical fibers. The feeder cable 70 enters the first fiber management area 40 of NID 10 through first port 25. If necessary, the feeder cable 70 is stain relieved at strain relief bracket 42, as previously described. As shown, a slack length 72 of feeder cable 70 is routed within the first fiber management area 40 in a clockwise direction under the retaining flanges 36. The feeder cable 70 is first routed to an optical device that separates the buffer tubes to be used initially from buffer tubes that are to be stored and used later if the subscriber requires additional fiber optic communications service. As shown, the feeder cable 70 is routed to a conventional fanout kit 44 that separate the optical fibers to be used initially from the optical fibers to be stored. The unused, or "dark," optical fibers (not shown) may be stored as bare fiber or in transport tubes within the first fiber management area 40 along with the slack length 72 of feeder cable 70.

The optical fiber pairs to be used initially are directed into one or more protective transport tubes 74, and each transport tube 74 is routed to a connection tray 64 in fiber connecting area 60. Inside the connection tray 64, the optical fibers of the feeder cable 70 are joined to corresponding first connectors 76 in a conventional manner. As previously mentioned, connection tray 64 may be any known device for joining optical fibers, for example a splice tray, a coupler tray, an adapter tray, a splice organizer, a splice holder, or the like. As shown, connection tray 64 is a splice tray and the optical fibers are joined to the first connectors 76 inside the splice tray by well known mechanical splice or fusion splice techniques. The first connectors 76 exit at the lower left-hand corner of the connection tray 64, as indicated by 77, and are routed to a corresponding adapter 67 on adapter bracket 66. Any slack length of the first connector 76 is first routed around the outer surface 68a of fiber guide 68 in a counter-clockwise direction between connection tray 64 and adapter 67. First connector 76 may be any type of fiber optic connector that permits the optical fiber of the feeder cable 70 to be optically joined to an optical fiber of the distribution cable 80 quickly, accurately, and conveniently, such as a jumper, a pigtail, or the like. Preferably, however, the first connector 76 is a pigtail type connector having an optical fiber for splicing to an optical fiber of the feeder cable 70 at one end and a "plug-and-play" duplex SC style connector at the other end.

Preferably, distribution cable 80 is a drop cable from an indoor outlet in a subscriber premises. Distribution cable 80 comprises a relatively flexible jacket made of a weather-proof material, such as plastic, for protecting at least one, and preferably at least a pair, of optical fibers. The jacket of the distribution cable 80 may encase one or more buffer tubes that each comprise at least a pair of optical fibers. The distribution cable 80 enters the second fiber management area 50 of NID 10 through second port 27. If necessary, the distribution cable 80 is stain relieved at strain relief bracket 52, as previously described. As shown, a slack length 82 of distribution cable 80 is routed within the second fiber management area 50 in a counter-clockwise direction under the retaining flanges 38. Although not shown herein, the distribution cable 80 may first be routed to an optical device that separates the optical fibers to be used initially from the optical fibers that are to be stored and used later if the subscriber requires additional fiber optic communications service. The unused, or "dark," optical fibers (not shown) may be stored as bare fiber or in transport tubes within the second fiber management area 50 along with the slack length 82 of distribution cable 80. The optical fiber pairs to be used are directed into one or more protective transport tubes, and each transport tube is routed to a connection tray 64 in fiber connecting area 60. As shown, however, the distribution cable 80 is routed directly from the second fiber management area 80 to the fiber connecting area 60.

Inside the connection tray 64, the optical fibers of the distribution cable 80 are joined to corresponding second connectors 86 in a conventional manner. As previously mentioned, connection tray 64 may be any known device for joining optical fibers, for example a splice tray, a coupler tray, an adapter tray, a splice organizer, a splice holder, or the like. As shown, connection tray 64 is a splice tray and the optical fibers are joined to the second connectors 86 inside the splice tray by well known mechanical splice or fusion splice techniques. The second connectors 86 exit at the lower right-hand corner of the connection tray 64, as indicated by 87, and are routed to a corresponding adapter 67 on adapter bracket 66. Any slack length of the second connector 86 is first routed around the outer surface 68a of fiber guide 68 in a clockwise direction between connection tray 64 and adapter 67. Second connector 86 may be any type of fiber optic connector that permits the optical fiber of the distribution cable 80 to be optically joined to an optical fiber of the feeder cable 70 quickly, accurately, and conveniently, such as a jumper, a pigtail, or the like. Preferably, however, the second connector 86 is a pigtail type connector having an optical fiber for splicing to an optical fiber of the distribution cable 80 at one end and a "plug-and-play" duplex SC style connector at the other end.

The second connector 86 is optically joined to the first connector 76 through the adapter 67 on adapter bracket 66 in a conventional manner. As a result, an optical fiber of the feeder cable 70 is connected to an optical fiber of the distribution cable 80 to establish fiber optic communications service to the subscriber. The NID 10 permits the service provider direct access to the optical components and the optical connections between the network and the subscriber, and in particular, provides access for installation, reconfiguration and test operations. The NID 10 also serves as the required demarcation point between the network fiber optic feeder cable 70 and the subscriber fiber optic distribution cable 80. Although preferred embodiments of the invention have been shown and described herein, many modifications and other embodiments of the invention will readily come to mind to one skilled in the art to which this invention pertains, and particularly, to one skilled in the art having the benefit of the teachings presented in the foregoing description and accompanying drawings. Therefore, it is to be understood that the invention is not intended to be limited to the specific embodiments disclosed herein and that further modifications and other embodiments are intended to be included within the scope of the appended claims. Although specific terms are employed herein, they are used in a generic and descriptive sense only and not for purposes of limitation.

That which is claimed is:

1. A network interface device for optically connecting an optical fiber of a feeder cable and an optical fiber of a distribution cable, the network interface device comprising:
   a base defining an internal cavity;
   a first port in communication with the internal cavity for receiving the optical fiber of the feeder cable;
   a second port in communication with the internal cavity for receiving the optical fiber of the distribution cable;
   a first fiber management area positioned within the internal cavity adjacent the first port for managing the optical fiber of the feeder cable;
   a second fiber management area positioned within the internal cavity adjacent the second port for managing the optical fiber of the distribution cable;
   a fiber connecting area positioned within the internal cavity adjacent the first fiber management area and the second fiber management area, the fiber connecting area comprising:
      at least one connection tray for optically connecting a first connector to the optical fiber of the feeder cable and a second connector to the optical fiber of the distribution cable; and
      an adapter for receiving the first connector and the second connector to optically connect the optical fiber of the feeder cable and the optical fiber of the distribution cable.

2. A network interface device according to claim 1 wherein the fiber connecting area is positioned within the internal cavity medially between the first fiber management area and the second fiber management area.

3. A network interface device according to claim 1 wherein at least one of the first fiber management area and the second fiber management area is positioned within the internal cavity at an elevation that is different than the elevation of the fiber connecting area.

4. A network interface device according to claim 1 wherein the first fiber management area and the second fiber management area are positioned within the internal cavity at a first elevation and the fiber connecting area is positioned within the internal cavity at a second elevation.

5. A network interface device according to claim 1 wherein the fiber connecting area further comprises at least one routing guide for maintaining the minimum bend radius of at least one of the optical fiber of the feeder cable and the optical fiber of the distribution cable.

6. A network interface device according to claim 1 further comprising a backplate positioned within the internal cavity, the backplate defining at least a first elevation and a second elevation, at least one of the first fiber management area and the second fiber management area located at the first elevation and the fiber connecting area located at the second elevation.

7. A network interface device according to claim 1 further comprising a fanout kit positioned within the first fiber management area for separating at least one optical fiber pair of the feeder cable into a transport tube.

8. A network interface device according to claim 1 further comprising a protective cover movably attached to the base.

9. An enclosure for housing an optical connection between an optical fiber of a feeder cable and an optical fiber of a distribution cable, the enclosure defining an internal cavity and comprising:
- a backplate positioned within the internal cavity and secured to the enclosure, the backplate defining a first fiber management area, a second fiber management area, and a fiber connecting area;
- a first port in communication with the first fiber management area for receiving the optical fiber of the feeder cable;
- a second port in communication with the second fiber management area for receiving the optical fiber of the distribution cable;
- at least one connection tray for connecting the optical fiber of the feeder cable to a first connector and the optical fiber of the distribution cable to a second connector; and
- an adapter for receiving the first connector and the second connector in optical alignment to optically connect the optical fiber of the feeder cable and the optical fiber of the distribution cable;
- wherein at least one of the first fiber management area and the second fiber management area is positioned at a first elevation relative to the backplate and the fiber connecting area is positioned at a second elevation relative to the backplate that is different than the first elevation.

10. An enclosure according to claim 9 wherein the fiber connecting area is positioned within the internal cavity medially between the first fiber management area and the second fiber management area.

11. An enclosure according to claim 9 wherein the first fiber management area and the second fiber management area are positioned within the internal cavity adjacent the fiber connecting area and wherein the fiber connecting area defines a platform that is elevated relative to the first fiber management area and the second fiber management area.

12. An enclosure according to claim 9 wherein the fiber connecting area further comprises at least one routing guide for maintaining the minimum bend radius of at least one of the optical fiber of the feeder cable and the optical fiber of the distribution cable.

13. An enclosure according to claim 9 further comprising a fanout kit positioned within the first fiber management area for separating at least one optical fiber pair of the feeder cable into a transport tube.

14. An enclosure according to claim 9 further comprising a protective cover that is movable between a closed position and an opened position.

15. A housing for interconnecting an optical fiber of a feeder cable and an optical fiber of a distribution cable at a subscriber premises, the housing defining an internal cavity and comprising:
- a first fiber management area positioned within the internal cavity at a first elevation;
- a first port in communication with the first fiber management area for receiving the optical fiber of the feeder cable;
- a second fiber management area positioned within the internal cavity at the first elevation;
- a second port in communication with the second fiber management area for receiving the optical fiber of the distribution cable;
- a fiber connecting area positioned within the internal cavity adjacent the first fiber management area and the second fiber management area at a second elevation that is different than the first elevation.

16. A housing according to claim 15 further comprising a backplate and wherein the second elevation is farther from the backplate than the first elevation.

17. A housing according to claim 15 wherein the fiber connecting area comprises
- at least one connection tray for optically connecting the optical fiber of the feeder cable to a first connector and the optical fiber of the distribution cable to a second connector; and
- an adapter for receiving the first connector and the second connector in optical alignment to optically connect the optical fiber of the feeder cable to the optical fiber of the distribution cable.

18. A housing according to claim 17 wherein the fiber connecting area further comprises at least one routing guide for maintaining the minimum bend radius of at least one of the optical fiber of the feeder cable and the optical fiber of the distribution cable, the routing guide located medially between the connection tray and the adapter.

19. A housing according to claim 15 further comprising a fanout kit positioned within the first fiber management area for separating at least one optical fiber pair of the feeder cable into a transport tube.

20. A housing according to claim 15 further comprising a protective cover that is movable between a closed position and an opened position.

21. A method of connecting an optical fiber of a feeder cable and an optical fiber of a distribution cable at a subscriber premises, the method comprising:
- providing a base defining an internal cavity, a first fiber management area positioned within the internal cavity at a first elevation, a first port in communication with the first fiber management area for receiving the optical fiber of the feeder cable, a second fiber management area positioned within the internal cavity at the first elevation, a second port in communication with the second fiber management area for receiving the optical fiber of the distribution cable, and a fiber connecting area positioned within the internal cavity adjacent the first fiber management area and the second fiber management area at a second elevation that is different than the first elevation;
- optically joining the optical fiber of the feeder cable from the first fiber management area to a first connector;
- optically joining the optical fiber of the distribution cable from the second fiber management area to a second connector;

optically joining the first connector to the second connector to thereby connect the optical fiber of the feeder cable and the optical fiber of the distribution cable.

22. A method according to claim 21 wherein the base comprises a backplate and wherein the second elevation is farther from the backplate than the first elevation.

23. A method according to claim 21 wherein the fiber connecting area comprises
- at least one connection tray for optically connecting the optical fiber of the feeder cable to the first connector and the optical fiber of the distribution cable to the second connector; and
- an adapter for receiving the first connector and the second connector in optical alignment to optically join the optical fiber of the feeder cable to the optical fiber of the distribution cable.

24. A method according to claim 23 wherein the fiber connecting area further comprises at least one routing guide for maintaining the minimum bend radius of at least one of the optical fiber of the feeder cable and the optical fiber of the distribution cable, the routing guide located medially between the connection tray and the adapter.

25. A method according to claim 21 further comprising a fanout kit positioned within the first fiber management area for separating at least one optical fiber pair of the feeder cable into a transport tube.

26. A method according to claim 21 further comprising a protective cover that is movable between a closed position and an opened position.

\* \* \* \* \*